Figure 1:
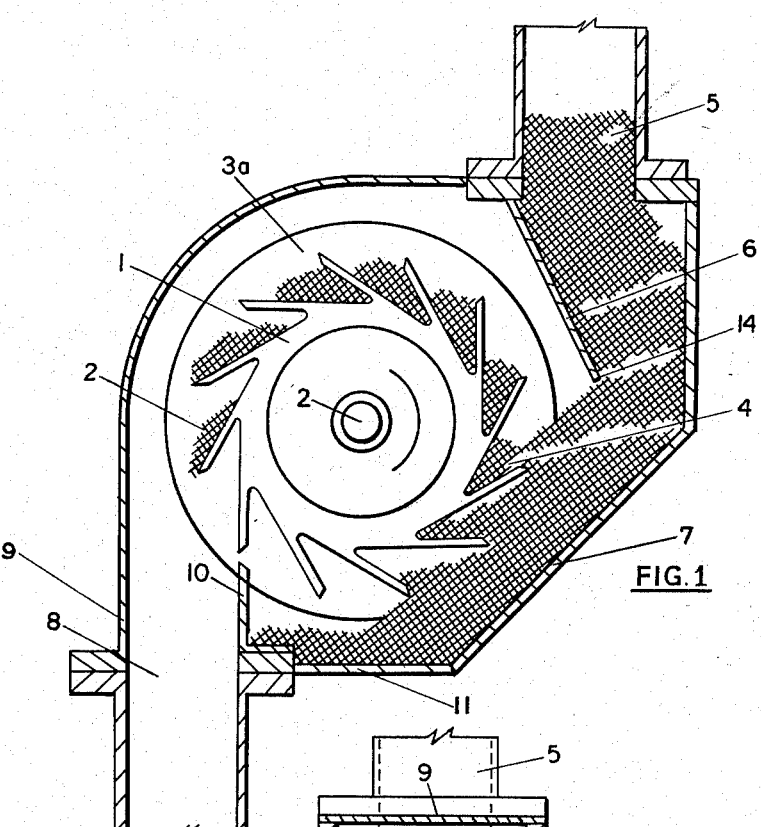

Oct. 6, 1959  I. W. F. SMITH  2,907,444
ROTARY APPARATUS FOR CONVEYING SOLID PARTICLES
Filed Dec. 9, 1957

INVENTOR
IAN WILLIAM FULTON SMITH

BY Cushman, Darby & Cushman
ATTORNEYS

United States Patent Office 2,907,444
Patented Oct. 6, 1959

2,907,444

ROTARY APPARATUS FOR CONVEYING SOLID PARTICLES

Ian William Fulton Smith, Harrogate, England, assignor to Imperial Chemical Industries Limited, London, England, a corporation of Great Britain Application December 9, 1957, Serial No. 701,537

Claims priority, application Great Britain December 17, 1956

1 Claim. (Cl. 198—50)

This invention relates to a process and appartus for conveying discrete solid particles at a steady rate. More particularly it relates to the conveying of polymer chips of substantially uniform size distribution from one part of a plant to another. Using known conveying means such as a rotor with scoops, difficulties are experienced in preventing blockages.

According to my invention I provide a process for conveying discrete solid particles of substantially uniform size distribution, such as polymer chips, at a steady rate using a rotor with scoops enclosed in a housing, and in which the particles are picked up by the scoops and emptied into an outlet such as a tube, characterized in that the solid particles are being fed by gravity on to a support, which is inclined towards a vertical rotor, at an angle greater than the natural repose angle of the solid particles, but less than 90°, without falling directly onto the rotor, the particles forming a layer sufficient for the scoops to be filled whilst traversing said layer, said rotor having a clearance of at least twice the diameter of the largest particles being scooped up, between it and any part of the housing enclosing the rotor.

By natural repose angle of the solid particles, I mean an angle formed between a horizontal plane and the surface of a layer of particles, when the particles have been deposited by a free fall from a height which does not cause a substantial disturbance of the particles already deposited. It will be appreciated that the particles will slide and/or fall whilst being supported at an angle greater than the natural repose angle of the particles, provided that the particles do not stick or adhere together.

The particles which enter the housing by some feed means, such as a tube or a hopper, slide down the inclined support in a direction opposite to the movement of the rotor. If desired, a baffle plate below the feed means and above the rotor can be used for deflecting the particles entering the housing so that the particles do not fall directly onto the rotor. To obtain efficient scooping the layer of particles should be replenished sufficiently for the scoops to be filled during their movement. The layer of particles should be substantially tangential to the bottoms of the scoops. It will be appreciated that the rotor should be rotated at a speed which will not throw the particles but scoop them up, so that they drop off by gravity and are emptied into the outlet during their downward movement. The housing and any part of the vertical rotor should have a clearance between it and the housing of at least twice the diameter of the largest particles being scooped. I have found that this prevents blockages caused by the moving parts. If such a clearance is provided any moving particles not scooped up by the scoops can fall towards the inclined support or towards the horizontal bottom of the housing where they accumulate on a layer of particles traversed by the scoops.

These conditions are fulfilled in an apparatus of our invention for conveying discrete solid particles of substantially uniform size, particularly polymer chips at a steady rate and comprising a circular vertical rotor with scoops, a housing enclosing said rotor, and having sides, top and bottom, with inlet and outlet orifices for the solid particles, the outlet being in the bottom of the housing below the rotor in that part traversed during the downward movement of the periphery of the rotor, characterized by the inlet for the solid particles being positioned in the top of the housing above the rotor in that part traversed during the upward movement of the periphery of the rotor, means for deflecting the particles whilst falling or gliding by gravity from the inlet away from the rotor, onto a support which is adjoining the bottom of the housing and which is inclined at an angle greater than the natural repose angle of the solid particles but less than 90° to facilitate the formation of a layer of particles sufficient to fill the scoops of the rotor traversing said layer, the sides of the housing enclosing the rotor having a clearance between the sides of the rotor sufficient to allow the escape of solid particles between it and the housing, this clearance being not less than twice the diameter of the largest particles being scooped up. Using this apparatus, any solid particles which fall off the scoops prematurely, escape to the bottom of the housing. In order to prevent the particles falling into the outlet orifice a baffle plate can be placed between the outlet opening in the bottom of the housing and the rotor.

The rotor scoops can have various shapes and I have found flat blades suitable, preferably tapered at their protruding edges, and which are attached tangentially at equal intervals around a concentric core on the rotor shaft. Depending on the diameter of the rotor and the core on the shaft, the number of blades should be selected so that adjacent blades subtend an angle of about 30° between adjacent blades, to form the scoops together with a pair of appropriately spaced circular discs attached to the shaft.

In the operation, the circular vertical rotor scoops up the particles during its upward movement from a layer in the lower bottom quadrant of the housing, which layer is being replenished with particles and which is supported at an angle greater than the natural repose angle of the particles. The particles are carried over to the fourth quadrant where they are emptied by gravity into the outlet opening in the bottom of the housing. Surplus particles which are scooped up before the scoops reach the fourth quadrant escape through the clearance between the sides of the rotor and the housing and fall to the bottom of the housing, where they accumulate and can be prevented to fall through the outlet by a baffle plate. By this means metered quantities of particles are being scooped up and delivered through the outlet during each revolution of the rotor.

The following description refers to the conveying of polyethylene terephthalate chips of substantially uniform size distribution by means of an apparatus shown in diagrammatic front and side section in the attached drawing, which illustrates but does not limit my invention.

Referring to the drawing Fig. 1 is a vertical side sectional view of the apparatus.

Figure 2:
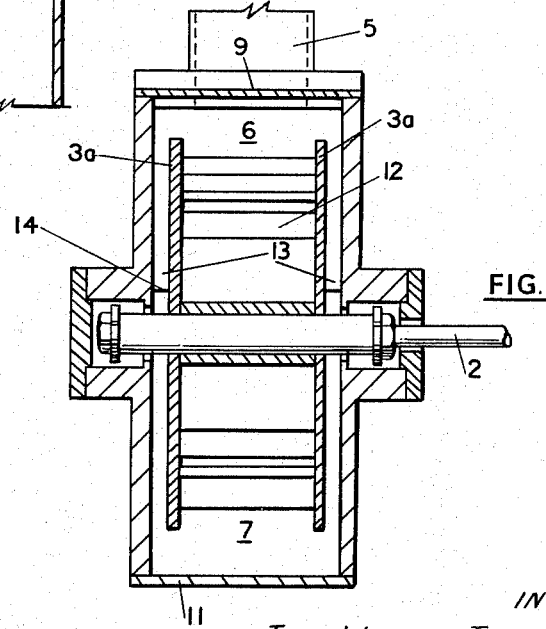

Fig. 2 is a sectional front view of the apparatus.

Referring to Fig. 1 the circular vertical rotor 1 is driven on its axis by a shaft 2. The rotor consists of twelve flat arms or blades 3 having flat tips with tapering edges, positioned between a pair of parallel circular discs 3a. Adjoining blades subtend an angle of 30° by being set tangentially in the concentric core of the rotor. Adjoining arms 3 in combination with the discs 3a form scoops 4. The angle of 30° between the arms which form the scoops is particularly suitable for conveying polyethylene terephthalate polymer chips. The rotor is enclosed in a housing 9 having an inlet opening 5 through which the particles are fed in a stream of air or by a hopper, and are deflected by a baffle plate 6 from the scoops of the rotor 1. The rotor is driven in an anti-clockwise direction. The particles i.e. the polyethylene terephthalate polymer chips, are in an air dry condition so that they do not stick together and slide down the support 7. The support 7 is inclined at an angle of 45° and positioned below the inlet opening 5. The angle of 45° is about 5° greater than the natural repose angle of the polyethylene terephthalate polymer chips. Adjoining the inclined support is the horizontal bottom of the housing 11 where any polymer particles which have not been scooped up, come to rest after sliding down in a layer supported by the inclined support 7. The chips are being scooped up by the scoops 4 of the rotor in the first quadrant of the rotor housing. The tip 14 of the baffle plate 6 determines the thickness of the layer of particles together with the floor of the housing 11 and the action of the scoops of the rotor 1. The sides of the rotor formed by discs 3a have a clearance 13 with the sides of the housing which is twice the diameter of the largest polymer chips being scooped up, e.g. when polymer chips of 3 mm. cubes are used, the clearance is at least 8 mm.

The rotor is rotated at 10 r.p.m. so that the chips are scooped up from the layer of particles in the first quadrant and drop off in the third and fourth quadrant of the housing. Any surplus chips which may drop off the scoops or are shed before they reach the position above the outlet aperture 8 fall back or slide to the bottom of the housing 11 and are prevented from escaping through the outlet 8 by a baffle plate or extended tube 10 above the outlet opening 8 where they add to the layer of particles being scooped up. The natural repose angle of the polymer chips is 40° so that the chips are scooped up from a continually replenished layer which is about 5° from parallel with the inclined support 7. The scoops dip into the layer of the polymer chips whilst the rotor is rotating anti-clockwise and the polymer chips are scooped up, carried over and emptied into the outlet aperture. It will be appreciated that at a given speed the rotor will deliver metered quantities of polymer chips through the outlet opening 8, any surplus chips being prevented to escape through the outlet 8 by the baffle plate 10 as it reaches near to the tips of the rotor scoops.

I have found stainless steel a suitable material of construction for the apparatus. Metered quantities of polyethylene terephthalate chips can be delivered provided that the chips do not stick together. Sticking of the chips can be prevented, if the chips are in an air dry condition.

No blockages are caused and the quantity of the material being conveyed can be controlled to very accurate limits either by controlling the speed of the rotor or by making slight adjustments to the baffle plate 6 or by a sideways shift in the position of the inlet opening.

It will be appreciated that the inlet opening as well as the outlet opening has to be sufficiently large to admit a quantity of particles at a rate in excess of that at which they are being carried by the rotor at a given speed.

Using the apparatus of my invention long periods of uninterrupted working are possible.

What I claim is:

An apparatus for conveying at a steady rate discrete solid particles of substantially uniform size comprising: a housing including opposed side, top and bottom walls; a rotor rotatably mounted within said housing between the side walls thereof with a clearance on each side a distance of at least twice the diameter of the largest particles being conveyed, said rotor including a core, a plurality of circumferentially spaced rotor arms extending tangentially outwardly from said core, and a pair of circular disks on opposite sides of said arms, said arms and disks defining a plurality of outwardly diverging wedge-shaped scoops of an angle of the order of 30°; said bottom wall having an outlet opening therein below the rotor in that part traversed during the downward movement of the periphery of the rotor, said top wall having an inlet opening therein above the rotor in that part traversed during the upward movement of the periphery of the rotor, said bottom wall including an upwardly inclined portion below said inlet opening; means for deflecting the particles falling by gravity from said inlet opening away from said rotor and onto said inclined bottom portion, the angle of inclination of said bottom portion being greater than the natural repose angle of the solid particles; and a baffle plate projecting upwardly from the bottom wall adjacent said outlet opening for preventing solid particles, other than those being scooped out, from passing through said outlet opening.

References Cited in the file of this patent

UNITED STATES PATENTS

| | | |
|---|---|---|
| 1,539,333 | Snyder | May 26, 1925 |
| 2,684,788 | Bland | July 27, 1954 |